United States Patent [19]

Stoka et al.

[11] 4,344,511

[45] Aug. 17, 1982

[54] FLOATING CALIPER-SPOT-TYPE DISC BRAKE

[75] Inventors: Roberto Stoka, Nauheim; Ulrich Lötzsch, Frankfurt am Main, both of Fed. Rep. of Germany

[73] Assignee: International Standard Electric Corporation, New York, N.Y.

[21] Appl. No.: 130,960

[22] Filed: Mar. 17, 1980

[30] Foreign Application Priority Data

Apr. 21, 1979 [DE] Fed. Rep. of Germany ....... 2916244

[51] Int. Cl.³ ............................................ F16D 65/14
[52] U.S. Cl. ................................................. 188/73.45
[58] Field of Search ........................... 188/73.39, 73.45

[56] References Cited

U.S. PATENT DOCUMENTS

| | | | |
|---|---|---|---|
| 3,310,135 | 3/1967 | Wells | 188/73.39 X |
| 3,500,966 | 3/1970 | Birge | 188/72.4 |
| 3,616,877 | 11/1971 | Collins | 188/73.3 |
| 3,889,785 | 6/1975 | Hori | 188/72.4 X |
| 4,171,035 | 10/1979 | Takaaki | 188/73.3 |
| 4,193,481 | 3/1980 | Wunderlich | 188/73.3 X |

FOREIGN PATENT DOCUMENTS

| | | |
|---|---|---|
| 1040917 | 10/1958 | Fed. Rep. of Germany . |
| 1286845 | 1/1969 | Fed. Rep. of Germany ..... 188/73.3 |
| 1625756 | 10/1972 | Fed. Rep. of Germany . |
| 2338361 | 2/1974 | Fed. Rep. of Germany ..... 188/72.4 |
| 2649627 | 5/1977 | Fed. Rep. of Germany ..... 188/73.3 |
| 2284800 | 4/1976 | France .............................. 188/73.3 |

*Primary Examiner*—George E. A. Halvosa
*Attorney, Agent, or Firm*—John T. O'Halloran; Alfred C. Hill

[57] ABSTRACT

The floating caliper-spot-type disc brake comprises two axially extending guide pins screwed into a threaded hole in the brake support. The ends of the pins which project over the edge of the brake disc support the brake shoes on both sides of the brake disc and abut upon arms of the brake support disposed parallel to the pins. The ends of the pins extending away from the brake disc extend into guide bore in the brake caliper forming an axial guide for the caliper. This disc brake requires little space between the wheel and brake disc and can be easily manufactured and easily assembled on the vehicle in which it is to be employed. Also brake shoe replacement is relatively easy.

15 Claims, 3 Drawing Figures

FLOATING CALIPER-SPOT-TYPE DISC BRAKE

BACKGROUND OF THE INVENTION

The present invention relates to a floating caliper-spot-type disc brake, especially for motor vehicles, with one brake support fixed adjacent one side of a brake disc having two arms arranged in the circumferential direction of the brake disc at a given distance from one another and extending over the edge of the brake disc. Brake shoes, which are disposed on both sides of the brake disc, are axially slideably guided in the two arms. A brake caliper embraces the edge of the brake disc and the brake shoes and carries a brake actuation device common to both brake shoes. Pins are detachably fixed at the brake support and extend parallel to the axis of rotation of the brake disc. The brake caliper is axially slideably guided and supported adjacent one end of the pins and a brake shoe connected to the brake caliper is axially slideably guided and supported adjacent the other end of the pins.

In a known brake of this type, such as disclosed in British Pat. No. 1,524,387 published Sept. 13, 1978, the arms of the brake support, by which a brake shoe is directly supported, extend approximately only to the middle of the brake disc and have a longitudinal bore, which serves for the support of the pins.

With one end the pins protrude over the brake disc and in this way form a prolongation of the arms, which support the other brake shoe. The disadvantage of this known disc brake is that it requires a large installation space radially outside the brake disc. Since the pins are stressed by bending by the friction force of the brake shoe supported by them they must have a relatively greater diameter and the brake support arms having the bores which must support the pins must be correspondingly thicker. The thickness of the brake support arms, however, in the end determines the necessary radial installation space outside the brake disc edge. A further disadvantage of the known brake is the different design of the two brake shoes, which results in higher production and stock-keeping costs.

Furthermore, a fixed caliper disc brake is known from German Patent No. DE-AS 1,040,917, published Oct. 9, 1958, in which cylindrical pins are provided for guiding and supporting the brake shoes with the pins being disposed in a guide of the brake housing. These pins rest in grooves in the side walls of the guide, wherein the depth of the grooves is slightly smaller than one half of the pin diameter. The parts of the pins protruding out of the grooves engage recesses in the carrier plates of the brake shoes in such a way that the friction forces occurring during the braking process at the brake shoes are transmitted via the pins to the brake housing. In this known disc brake the arrangement of the pins, however, necessitates separate pins for each brake shoe.

Additionally, a floating caliper-spot-type disc brake is known from German Pat. No. DE-AS 1,625,756, published Oct. 5, 1972 in which two pins fixed at the brake carrier serve the purpose of guiding the brake caliper and holding both brake shoes.

In this known brake the friction forces of the brake shoes are not received by the pins but rather by additional guiding elements of the brake carrier. The guiding elements support one brake shoe via the brake caliper and support the other brake shoe directly. Due to this arrangement the brake has a more complicated construction and its production is more expensive.

SUMMARY OF THE INVENTION

An object of the present invention is to provide a disc brake of the type mentioned above, which requires a smaller installation space radially outside the brake disc.

A feature of the present invention is the provision of a floating caliper-spot-type disc brake comprising:
  a brake support disposed on one side of a brake disc having a pair of spaced arms parallel to the axis of rotation of the brake disc and extending over the edge of the brake disc, the pair of arms each having an inner surface thereon facing one another;
  a pair of brake shoes each disposed adjacent and parallel to a different side of the brake disc and having lateral supporting edges thereof adjacent the pair of arms;
  a brake caliper embracing the edge of the brake disc and the pair of brake shoes having in one leg thereof a brake actuating device abutting an adjacent one of the pair of brake shoes and the other leg thereof abutting the other of the pair of brake shoes; and
  a pair of guide pins each parallel to the axis of the brake disc, detachably secured to a different one of the pair of arms in a middle section thereof, having one end section thereof disposed between an associated one of the inner surface of the pair of arms and an associated one of the lateral supporting edges of the pair of brake shoes to axially slideably guide and support the pair of brake shoes and the other end section thereof engaging the brake caliper to axially slideably guide the brake caliper, the one end section of the pair of guide pins transmitting braking force from the pair of brake shoes to the pair of arms and the pair of brake shoes partially encompass the pair of guide pins.

In a brake according to the present invention the brake caliper and the brake shoes are exclusively held and guided by the pins, which for their part, however, are supported by the brake carrier in the direction of strain and therefore are exposed to only a slight bending stress. In this way the diameter of the pins can be dimensioned relatively small so that radially outside the edge of the brake disc only a small installation space is necessary. The small pin diameter also leads to a sufficiently high specific pressure between the brake shoes and the pins, by which a self-purification at these surfaces is achieved and a slight slideability of the brake shoes is guaranteed. The assembly and maintenance of the brake according to the present invention is very simple, since only the pins must be removed in order to detach the brake caliper and the brake shoes from the brake carrier.

With an advantageous arrangement of the pins, it is sufficient for exchanging the brake shoes if only one pin is removed. Then the caliper together with the brake shoes can be deviated around the other pin far enough so that the brake shoes can be disassembled. The brake according to the present invention furthermore permits without great expenditure renewing the guide surfaces of the brake shoes and the brake caliper with each replacement of the brake shoes by replacing the pins together with the brake shoes.

An advantageous embodiment of the present invention is that the pins have a construction in the area of the brake disc edge. Hereby, a greater interspace between the pins and the brake disc edge is created so that the distance between the pin axis and the brake disc edge can be dimensioned even smaller. A further advantage is that the pins are made of one piece and carry a thread in their mid area by which they can be screwed into the brake carrier remote from the brake disc. The maintenance of the brake in particular is considerably simplified by this measure! By having the pins supported in the radial direction by the arms of the brake carrier, the abutting surfaces at the arms are formed by cylindrical grooves and have the same contour as the surface of the pins.

BRIEF DESCRIPTION OF THE DRAWING

Above mentioned and other features and objects of this invention will become more apparent by reference to the following description taken in conjunction with the accompanying drawing, in which.

DESCRIPTION OF THE PREFERRED EMBODIMENT

Figure 1:
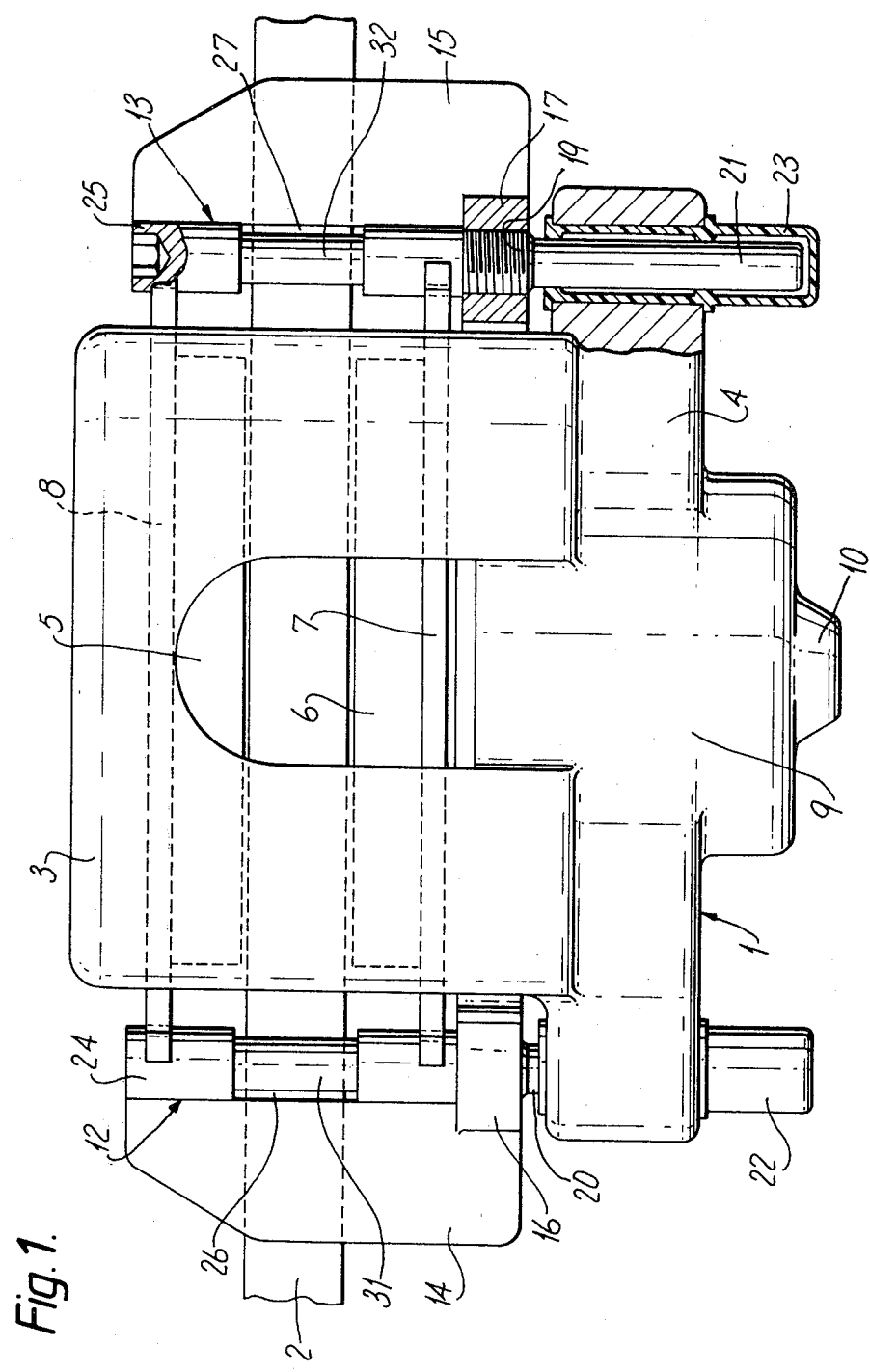
FIG. 1 is a top view of a disc brake in accordance with the principles of the present invention.
Figure 2:
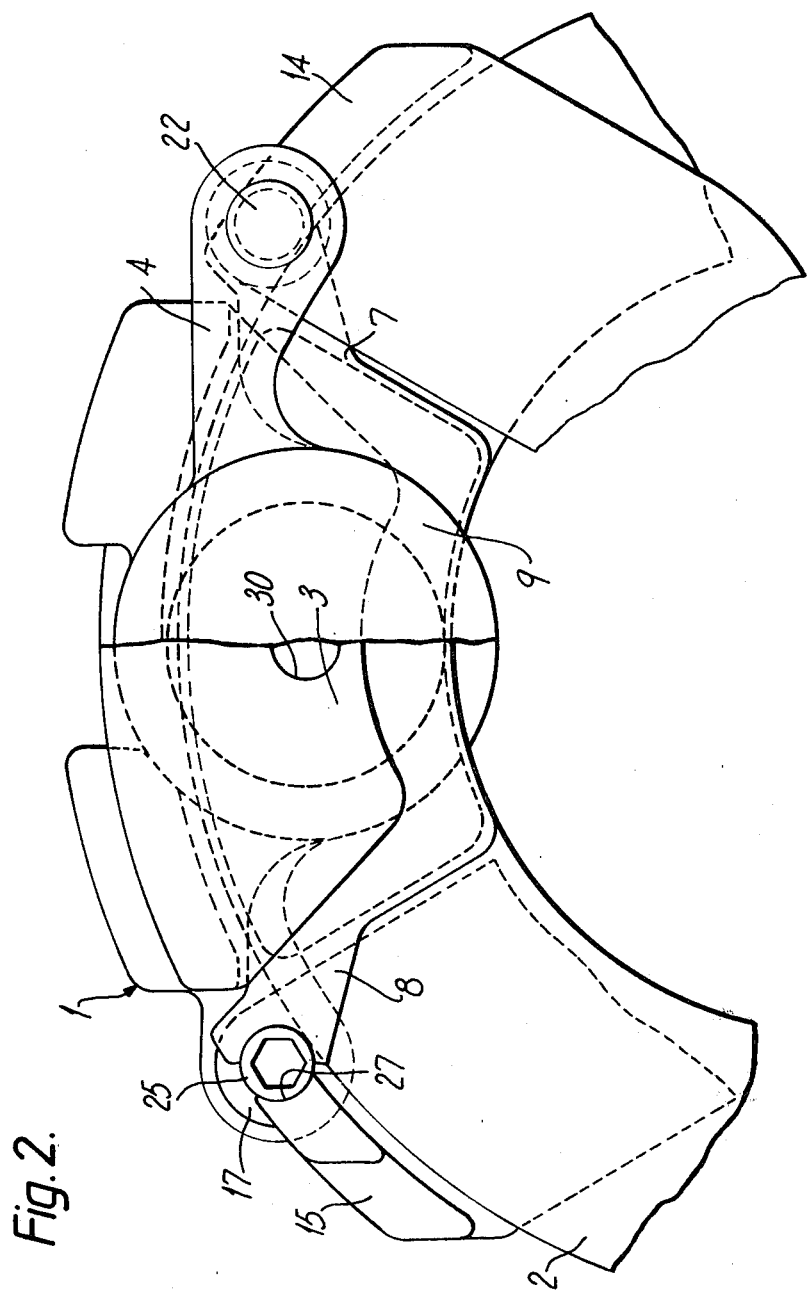
FIG. 2 illustrates in the left half thereof a front view of the disc brake of FIG. 1 and in the right half thereof a back view of the disc brake of FIG. 1.
Figure 3:
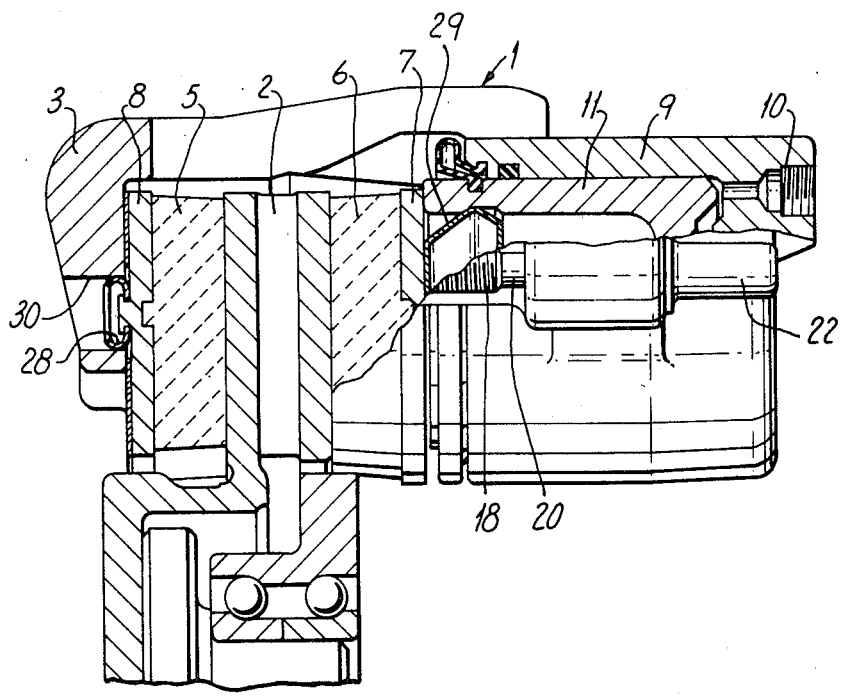
FIG. 3 is a side view, partially in cross-section, of the disc brake of FIG. 1.

The disc brake shown in FIGS. 1-3 includes a brake caliper 1 which with its two legs 3 and 4 aligned parallel to the brake disc 2 encompasses the edge of brake disc 2 and brake shoes 5 and 6 having carrier plates 7 and 8, respectively, arranged on both sides of brake disc 2.

Leg 4 of brake caliper 1 carries a brake cylinder 9 which is operated hydraulically and which is connectable to the line system of a motor vehicle brake system via a connection 10. In brake cylinder 9 a cup-shaped piston 11 (FIG. 3) is arranged with the front of its open end abutting carrier plate 7. The back of carrier plate 8 abuts the surface of leg 3 of caliper 1 facing brake disc 2. Carrier plates 7 and 8 of brake shoes 5 and 6, respectively, and brake caliper 1 are held and guided by the pins 12 and 13, which in turn are fixed at the arms 14 and 15 of a brake carrier which is produced in one piece with the wheel carrier and which is not described in more detail. For purpose of fixing pins 12 and 13 to arms 14 and 15 there are brackets 16 and 17 having thread through bores therein provided at arms 14 and 15. Pins 12 and 13 contain thread sections 18 and 19 disposed approximately in the middle thereof which are screwed into the threaded bores of brackets 16 and 17. The ends 20 and 21 of pins 12 and 13 are thinner than thread sections 18 and 19 and project into elastic guide bushings 22 and 23, which are fixed in leg 4 of brake caliper 1.

Thus, ends 20 and 21 serve exclusively for the purpose of guiding and holding brake caliper 1 at the brake carrier. The ends 24 and 25 of pins 12 and 13 projecting over brake disc 2 hold and support brake shoes 5 and 6. For this purpose carrier plates 7 and 8 of brake shoes 5 and 6 encompass with their branched ends the outer surfaces of pins 12 and 13, whereby they are held in a radial and a tangential direction in relation to brake disc 2. The outer surface of ends 24 and 25 of pins 12 and 13 abut the surfaces of arms 14 and 15. These surfaces of arms 14 and 15 are designed as cylindrical grooves 26 and 27. In the area above brake disc 2 pins 12,13 have a constriction 31 and 32, respectively, so that a sufficient distance between the pins and the brake disc is guaranteed.

FIG. 3 shows brake caliper 1 together with brake disc 2 from the side, omitting, however, arm 14 of the brake carrier. Here one sees that carrier plates 7 and 8 are fixed to brake caliper 1 by clamping springs 28 and 29, respectively. Clamping spring 28 engages a bore 30 in caliper leg 3. Clamping spring 29 is caught in the bore of cup-shaped piston 11. These springy holding devices for brake shoes 5 and 6 prevents the brake shoes from clattering with the brake released and serves for the purpose of fixing brake shoes 5 and 6 to brake caliper 1 during the transportation of these parts to the producer of vehicles. Brake caliper 1 is in addition guided at carrier plate 8 by clamping spring 28.

During application of the brake, brake shoe 6 is pressed against brake disc 2 by cup-shaped piston 11 and brake shoe 5 is pressed against brake disc 2 by leg 3. The braking force occurring through the friction contact of brake shoes 5 and 6 with brake disc 2 is transmitted by carrier plates 7 and 8 to the back pin 12 or 13, respectively, when seen in the direction of rotation of the brake disc. Pin 12 or 13 to which the braking force is transmitted is supported in groove 26 or 27, respectively, and in this way transmits the braking force to arm 14 or 15, respectively, of the brake carrier, which is resistant to bending. By the front pin, seen in the respective direction of rotation of the brake disc, a horizontal swing of the brake shoes around the pin receiving the braking force is avoided.

The aim in the described embodiment of the brake disc of the present invention is that there is no gap between grooves 26 and 27 and pins 12 and 13 in the unstrained condition of the brake. To simplify production, a gap may also be admitted without, however, the functioning of the brake being affected. The elasticity of pins 12 and 13 is so great that this gap is overcome with slight braking forces and the pins find a firm support at arms 14 and 15.

The assembly of the brake, e.g. in case of an installation into a vehicle, is very simple.

Before assembling the wheels, the unit including brake caliper 1 and brake shoes 5 and 6 is pushed onto brake disc 2 in the radial direction between arms 14 and 15 of the brake carrier. Subsequently, from the side of the wheel pins 12 and 13 are pushed in between arms 14 and 15 and the ends of carrier plates 7 and 8 are rigidly screwed into brackets 16 and 17 of arms 14 and 15.

The insertion of pins 12 and 13 is facilitated by means of grooves 26 and 27 which provide a guide for pins 12 and 13. Openings are provided in the ends of ends 24 and 25 for inserting a wrench to enable tightening pins 12 and 13 in brackets 16 and 17. The insertion of pins 12 and 13 from the side of the wheel does not only facilitate the assembly of the brake unit, but also allows a shaping of the guiding sleeves 22 and 23 with closed ends on one side, so that the sliding surfaces of pin ends 20 and 21 are protected.

For replacing brake shoes 5 and 6 it is only necessary to unscrew one of pins 12 and 13. Then brake caliper 1 can be deviated far enough around the other of pins 12 and 13 so brake disc 2 comes out of the space between brake shoes 5 and 6. Then brake shoes 5 and 6 can be axially shifted far enough so that the clamping springs 28 and 29 loosen and brake shoes 5 and 6 can be taken out of brake caliper 2 by pulling brake shoes 5 and 6 radially inward. The reverse process is performed to insert new brake shoes.

Since in the brake according to this present invention, carrier plates 7 and 8 of brake shoes 5 and 6 do not directly abut arms 14 and 15 of the brake carrier, the brake carrier can advantageously be made of a light alloy, because the pins which are preferably made of corrosion-proof steel form an element of force transfer which has the resistance to pressure and the resistance to wear necessary at the abutting place of the pad carrier plates.

While I have described above the principles of our invention in connection with specific apparatus it is to be clearly understood that this description is made only by way of example and not as a limitation to the scope of our invention as set forth in the objects thereof and in the accompanying claims.

We claim:

1. A floating caliper-spot-type disc brake comprising:
a brake support disposed on one side of a brake disc having a pair of spaced arms parallel to the axis of rotation of said brake disc and extending over the edge of said brake disc, said pair of arms each having an inner surface thereon facing one another;
a pair of brake shoes each disposed adjacent and parallel to a different side of said brake disc and having lateral supporting edges thereof adjacent and in opposing relationship to said inner surfaces of said pair of arms;
a brake caliper embracing the edge of said brake disc and said pair of brake shoes having in one leg thereof a brake actuating device abutting an adjacent one of said pair of brake shoes and the other leg thereof abutting the other of said pair of brake shoes; and
a pair of elongated cylindrical guide pins each parallel to said axis of said brake disc, detachably secured to a different one of said pair of arms in a mid section thereof adjacent said one leg of said brake caliper, having one end section thereof coextensive with an associated one of said inner surface of said pair of arms and disposed between and bearing against each of said associated one of said inner surface of said pair of arms and an associated one of said lateral supporting edges of said pair of brake shoes to axially slidably guide and support only said pair of brake shoes and the other end section thereof engaging a different one of two spaced bores in said one leg of said brake caliper to axially slidably guide said brake caliper at only said one leg thereof, said one end section of said pair of guide pins transmitting braking force from said pair of brake shoes to said pair of arms and said pair of brake shoes only partially encompass said pair of guide pins.

2. A disc brake according to claim 1, wherein each of said one end section of said pair of pins have a constriction therein in the area of the edge of said brake disc.

3. A disc brake according to claim 2, wherein each of said pair of pins are made of one piece and carry in said middle section a thread that is screwed into a threaded bore in an associated one of said pair of arms.

4. A disc brake according to claim 3, wherein each of said inner surfaces of said pair of arms is formed as a cylindrical groove having the same contour as the outer surface of an associated one of said pair of pins.

5. A disc brake according to claim 4, wherein said other end section of each of said pair of pins is received in an elastic guide bushing carried by an associated one of said two bores in said caliper.

6. A disc brake according to claim 5, wherein each of said elastic guide bushings is closed to protect the end of an associated one of said other end section of each of said pair of pins.

7. A disc brake according to claim 1, wherein each of said pair of pins are made of one piece and carry in said middle section a thread that is screwed into a threaded bore in an associated one of said pair of arms.

8. A disc brake according to claim 7, wherein each of said inner surfaces of said pair of arms is formed as a cylindrical groove having the same contour as the outer surface of an associated one of said pair of pins.

9. A disc brake according to claim 8, wherein said other end sections of each of said pair of pins is received in an elastic guide bushing carried by an associated one of said two bores in said caliper.

10. A disc brake according to claim 9, wherein each of said elastic guide bushings is closed to protect the end of an associated one of said other end section of each of said pair of pins.

11. A disc brake according to claim 1, wherein each of said inner surfaces of said pair of arms is formed as a cylindrical groove having the same contour as the outer surface of an associated one of said pair of pins.

12. A disc brake according to claim 11, wherein said other end section of each of said pair of pins is received in an elastic guide bushing carried by an associated one of said two bores in said caliper.

13. A disc brake according to claim 12, wherein each of said elastic guide bushings is closed to protect the end of an associated one of said other end section of each of said pair of pins.

14. A disc brake according to claim 1, wherein said other end section of each of said pair of pins is received in an elastic guide bushing carried by an associated one of said two bores in said caliper.

15. A disc brake according to claim 14, wherein each of said elastic guide bushings is closed to protect the end of an associated one of said other end section of each of said pair of pins.

* * * * *